United States Patent [19]

Chubachi et al.

[11] Patent Number: 4,788,092
[45] Date of Patent: Nov. 29, 1988

[54] DISC-SHAPED MAGNETIC RECORDING MEDIUM

[75] Inventors: Ryoji Chubachi; Yoshihisa Kawamura, both of Sendai; Nobuyuki Nihei, Shiogama, all of Japan

[73] Assignee: Sony Corporation, Tokyo, Japan

[21] Appl. No.: 535,011

[22] PCT Filed: Jan. 10, 1983

[86] PCT No.: PCT/JP83/00007

§ 371 Date: Sep. 9, 1983

§ 102(e) Date: Sep. 9, 1983

[87] PCT Pub. No.: WO83/02520

PCT Pub. Date: Jul. 21, 1983

[30] Foreign Application Priority Data

Jan. 14, 1982 [JP] Japan ................................ 57-4356

[51] Int. Cl.$^4$ .............................................. G11B 5/714
[52] U.S. Cl. ...................................... 428/65; 428/323; 428/329; 428/694; 428/900
[58] Field of Search ................... 428/694, 64, 65, 323, 428/329, 900

[56] References Cited

U.S. PATENT DOCUMENTS

| | | | |
|---|---|---|---|
| 3,865,627 | 2/1975 | Roden et al. ........................ | 427/132 |
| 4,109,046 | 8/1978 | Hammon et al. .................... | 428/900 |
| 4,208,447 | 6/1980 | Bate et al. .......................... | 427/48 |
| 4,395,447 | 7/1983 | Nakamatsu et al. ................ | 478/694 |
| 4,425,401 | 1/1984 | Ido et al. ............................ | 428/694 |
| 4,439,486 | 3/1984 | Yamada et al. ..................... | 428/694 |

FOREIGN PATENT DOCUMENTS 57-154618 9/1982 Japan ................................... 428/900

*Primary Examiner*—George F. Lesmes
*Assistant Examiner*—William M. Atkinson
*Attorney, Agent, or Firm*—Hill, Van Santen, Steadman & Simpson

[57] ABSTRACT

The present invention provides a disc-shaped magnetic recording medium particularly suitable for high density recording obtainable a high output power with low noise. In the disc-shaped magnetic recording medium according to the present invention, a ferromagnetic powder having a coercive force of about 1,000 Oe or higher and a BET specific surface area in the range from about 25 to 70 m$^2$/g is employed. This allows a decrease in noise level and satisfies the electromagnetic performance requirements for high density recording. A random (unoriented) orientation or a circumferential orientation of the ferromagnetic powder in the magnetic layer provides high output power without causing a variation in output power.

5 Claims, No Drawings

DISC-SHAPED MAGNETIC RECORDING MEDIUM

TECHNICAL FIELD

The present invention relates to a disc-shaped magnetic recording medium and, more particularly, to a disc-shaped magnetic recording madium for high density recording having particularly a low noise level and a high output power.

BACKGROUND ART

In a magnetic disc device, a magnetic head scans a magnetic surface concentrically in the circumferential direction. For this reason, if magnetic particles are oriented in either a lengthwise or in a widthwise direction as in an elongated magnetic tape, reproduction output differs between the orientation direction and a direction different therefrom, causing a variation in output power. Therefore, magnetic particles of a disc-shaped magnetic recording medium to be used for a magnetic disc device should be oriented at random (unoriented) or in the circumferential direction.

In a so-called electronic camera and the like currently under rapid development which is designed to record still image information and so forth on a magnetic disc, it has also been sought to meet strict requirements for electromagnetic properties of a magnetic layer of the magnetic disc in order to satisfy a demand for high density recording by short wavelength recording. Magnetic particles of the iron oxide type conventionally used heretofore cannot, however, meet such strict requirements.

DISCLOSURE OF INVENTION

Therefore, it is an object of the present invention to provide a disc-shaped magnetic recording medium which in particular can satisfy requirements based on a demand for high density recording by short wavelength recording and has a low noise level and a high output power.

The disc-shaped magnetic recording medium according to the present invention is prepared by dispersing in a binder a magnetic powder having a coercive force of about 1,000 Oe or higher and a BET specific surface area of about 25 to 70 m$^2$/g, and then providing a magnetic layer of the resultant material on a non-magnetic substrate so as to orient the dispersed powder particles at random (unoriented) or in the circumferential direction.

The ferromagnetic powder to be used for the present invention may include a ferromagnetic metal or alloy powder. For example, iron oxyhydroxide or iron oxyhydroxide containing cobalt or the like (doped or cladded), or a metal or an alloy composed mainly of iron such as acicular iron obtainable by reduction of iron oxide in a reducible atmosphere, may be enumerated as appropriate powders. In accordance with the present invention, such magnetic powders have a coercive force of about 1,000 Oe or higher and a BET specific surface area of about 25 to 70 m$^2$/g. If the coercive force of the magnetic powder to be used is smaller, various performance levels required for high density recording by short wavelength recording cannot be achieved. Even if the coercive force is 1,000 Oe or higher, magnetic powders of the Co-$\gamma$-Fe$_2$O$_3$ series have insufficient magnetic properties so that they are inappropriate for unoriented discs for electronic cameras or the like requiring clear pictures, because of their small residual magnetic flux density (Br). It is accordingly desirable that the magnetic disc recording medium according to the present invention has a Br value along the circumferential direction of 1,500 Gauss or higher. If the BET specific surface area of the magnetic powder to be used is larger, a noise level is decreased, but this is not preferred because of a corresponding decrease in dispersibility which causes difficulties in magnetic treatment for random or circumferential orientation, whereby a decrease in Br is caused and consequently an RF-output is decreased or a C/N ratio is deteriorated. If the BET specific surface area is too large, noise levels are undesirably increased.

A binder in which the magnetic powders described hereinabove are dispersed may be any one that is used for conventional magnetic recording media, and is not restricted to any particular one. As such a binder, there may be enumerated a vinylchloride-vinyl acetate copolymer, a vinyl chloride-vinyl acetate-vinyl alcohol copolymer, a vinyl chloride-vinyl acetate-maleic acid copolymer, a vinyl chloride-vinylidene chloride copolymer, a vinyl chloride-acrylonitrile copolymer, an acrylic ester-acrylonitrile copolymer, an acrylic ester-vinylidene chloride copolymer, a methacrylic ester-vinylidene chloride copolymer, a methacrylic ester-styrene copolymer, a thermoplastic polyurethane resin, a phenoxy resin, polyvinyl fluoride, a vinylidene chloride-acrylonitrile copolymer, a butadiene-acrylonitrile copolymer, an acrylonitrile-butadiene-acrylic acid copolymer, an acrylonitrile-butadiene-methacrylic acid copolymer, polyvinyl butyral, a cellulose derivative, a styrene-butadiene copolymer, a polyester resin, a phenol resin, an epoxy resin, a thermosetting polyurethane resin, a urea resin, a melamine resin, an alkyd resin, a urea-formaldehyde resin or a mixture thereof, or the like.

A solvent to be used for dispersion of the magnetic powder in the binder may include, for example, a ketone such as acetone, methyl ethyl ketone, methyl isobutyl ketone, cyclohexanone or the like; an alcohol such as methanol or the like; an ester such as methyl acetate, ethyl acetate, butyl acetate, ethyl butyrate or the like; a glycol ether such as ethylene glycol dimethyl ether, ethylene glycol monoethyl ether, dioxane or the like; an aromatic hydrocarbon such as benzene, toluene, xylene or the like; an aliphatic hydrocarbon such as hexane, heptane or the like; or a mixture of these solvents.

As a material to be used for a non-magnetic substrate, there may be enumerated a non-magnetic material such as, for example, a polyester such as polyethylene terephthalate, polyethylene-2,6-naphthalate or the like; a polyolefin such as polyethylene, polypropylene or the like; a cellulose derivative such as cellulose triacetate, cellulose diacetate, nitrocellulose or the like; a vinyl resin such as polyvinylidene chloride, polyvinyl chloride or the like; a polyimide; a polyamide; a polycarbonate; a metal such as aluminum, copper or the like; or paper. The non-magnetic substrate may be appropriately chosen to have a thickness ranging from about 10 to 100 μm according to various applications.

In accordance with the present invention, the procedure of forming on the non-magnetic substrate a magnetic layer composed of a magnetic powder and a binder as described hereinabove is not restricted to any particular one, but may be any procedure that can form a magnetic layer of a magnetic recording medium and that can be conveniently selected from conventional coating methods. The thickness of the magnetic layer to be formed thereon may be appropriately chosen within a range from about 0.5 to 5 μm.

The magnetic layer formed by the procedure as described hereinabove is then treated generally by a magnetic treatment for disorientation or circumferential orientation. For example, a so-called batch technique comprising coating a magnetic layer on a non-magnetic substrate in a sheet form or in a tape form and then punching discs one by one produces little anisotropy within the disc and provides a unoriented state. The magnetic discs prepared using the above technique are then treated in a conventional manner to render their surfaces smooth so that the magnetic powder particles are partly physically oriented in the tape travel direction (lengthwise direction) of a coater on account of a shear stress caused by a smoother or the like, whereby a degree of orientation (MR) between the lengthwise direction and the direction perpendicular thereto, or a ratio ($Rs''/Rs^{\perp}$) of the square ratio ($Rs''$) in the lengthwise direction to the square ratio ($Rs^{\perp}$) in the direction perpendicular to the lengthwise direction, does not become 1. Accordingly, a random orientation treatment may thereafter be conducted so as to make the degree of orientation equal to 1 by applying an A.C. magnetic field smaller than the coercive force (Hc) of the magnetic powder used. In this case, it is preferable to use an A.C. field generator such as an A.C. solenoid or the like which is variable, for example, from 0 to 2,000 Oe. Another treatment method for magnetic orientation is one which, for example, comprises carrying out orientation by applying a first orienting magnetic field in one direction and then applying a second orienting magnetic field smaller than the first magnetic field in the reverse direction. It is to be noted, however, that the treatment method for magnetic orientation to be used for the present invention is not restricted to any particular one and may be conducted by any orientation method that can form a magnetic layer in a random orientation or in a circumferential orientation on a non-magnetic substrate. By the term "random" or "unoriented" referred to herein is meant, in a case where discs are prepared by punching a length of raw tape, a difference between the square ratio ($Rs''$) in the lengthwise direction of the raw tape and the square ratio ($Rs^{\perp}$) in the direction perpendicular thereto is less than about 20%. That is to say, the term refers to a case wherein the square ratio ($Rs^{\perp}$) in the direction perpendicular to the lengthwise direction is more than 80% (but less than 100%) of the square ratio ($Rs''$) in the lengthwise direction. It is further preferred that the difference is 5% or less.

The magnetic layer may contain an additive such as an antistatic agent, a lubricant, an abrasive, a dispersing agent or the like. As such an additive, there may be enumerated carbon black, graphite, talc, $Cr_2O_3$, alumina, red iron oxide, silicone oil, an aliphatic acid ester, lecithin, squalane and so on.

The non-magnetic substrate may be provided on its rear surface with a back coating layer in order to prevent its becoming charged with electricity, improve sliding performance, reinforce strength and so on. For this purpose, the additives as described hereinabove such as, for example, an antistatic agent, a lubricant, an abrasive and, if needed, a dispersing agent for dispersing the above additives homogeneously are milled with a given binder and solvent to produce a paint, and the paint is then coated on the rear surface of the non-magnetic substrate. The additives and binder to be used may be conveniently chosen from those enumerated hereinabove.

BEST MODE OF CARRYING OUT THE INVENTION

The present invention will be described by way of working examples.

EXAMPLE 1

| Composition | Amount (Parts by Weight) |
| --- | --- |
| Ferromagnetic acicular iron particles (Coercive Force, 1,180 Oe; BET specific surface area, 25 m²/g) | 100 |
| Vinyl chloride-vinyl acetate copolymer (Tradename "VYHH", Union Carbide) | 10 |
| Thermoplastic polyurethane resin (Tradename "Estan 5701", B. F. Goodrich) | 6 |
| $Cr_2O_3$ | 10 |
| Lecithin | 2 |
| Fatty ester | 1 |
| Toluene | 50 |
| Methyl ethyl ketone | 50 |
| Cyclohexanone | 50 |

A mixture having the above composition was ball milled for 24 hours and then mixed with 5 parts by weight of isocyanate compound (Tradename "Colonate L", Nippon Polyurethane Kogyo K.K.), and the mixture was dispersed by shearing at high speed for 1 hour to produce a magnetic paint.

The resultant magnetic paint was coated on a 36 μm polyethylene terephthalate film base at a coater velocity of 20 m/min to a thickness of 4 μm, and the film was passed through an A.C. solenoid (frequency, 50 Hz; 5 amperes) while the coating was still in a fluid state to give a raw magnetic tape which was then dried. The raw magnetic tape was then subjected to a supercalendering treatment, and was provided at its rear surface with a 2 μm antistatic layer. The resulting tape was found to have a difference between Rs in the lengthwise direction and Rs in the widthwise direction perpendicular thereto of less than 5%, and to be in a unoriented state. The tape was then punched to obtain magnetic discs having a diameter of 47 mm.

EXMAPLES 2-8

The procedures of Example 1 were followed with the exception that the coercive force and the BET specific surface area of the ferromagnetic acicular iron particles were varied as shown in the table below to obtain various magnetic discs.

COMPARATIVE EXAMPLES 1-2

The procedures of Example 1 were followed with the exception that the coercive force and/or the BET specific surface area of the ferromagnetic acicular iron particles were varied as shown in the table below to obtain various magnetic discs.

COMPARATIVE EXAMPLE 3

Magnetic discs were prepared by following the procedures of Example 1 with the exception that conventional Co-γ-$Fe_2O_3$ particles having a coercive force and a BET specific surface area as described in the table below were used.

The magnetic discs prepared in the above Examples and Comparative Examples were measured for their RF-output and C/N ratio. The results are shown in the table below.

TABLE

|  | Specific surface area (m²/g) | Br (Gauss) | Hc (Oe) | RF-output (db) | C/N (db) |
|---|---|---|---|---|---|
| Example 1 | 25 | 3460 | 1160 | +13.9 | 51.0 |
| Example 2 | 28 | 3240 | 1165 | +13.3 | 51.4 |
| Example 3 | 35 | 2730 | 1190 | +12.0 | 52.0 |
| Example 4 | 40 | 2610 | 1190 | +11.7 | 52.9 |
| Example 5 | 47 | 2010 | 1205 | +9.5 | 52.2 |
| Example 6 | 51 | 1900 | 1195 | +9.2 | 52.5 |
| Example 7 | 59 | 1690 | 1230 | +8.0 | 52.0 |
| Example 8 | 70 | 1550 | 1210 | +7.2 | 51.2 |
| Comparative Example 1 | 18 | 3495 | 1180 | +14.0 | 48.2 |
| Comparative Example 2 | 72 | 1410 | 1160 | +6.0 | 49.5 |
| Comparative Example 3 | 25 | 620 | 510 | 0 | 44 |

Conditions for measuring the RF-output and C/N ratio were as follows. A measuring apparatus used was a prototype magnetic disc recorder manufactured by Sony Corporation.

RF-output: Relative Velocity, 6.0 m/sec; Recording frequency, 5 MHz (Recording wavelength λ: 1.2 μm); Recording head: Sendast; Reproducing head; ferrite. track width, 60 μm C/N ratio: Relative velocity, 6.0 m/second; recording central frequency, 5 MHz; Modulating frequency, 1 MHz From the above results, it was found that the magnetic discs according to the present invention were superior in RF-output and C/N ratio to the magnetic discs of the Comparative Examples.

We claim:

1. A disc-shaped magnetic recording medium characterized in that a non-magnetic substrate is provided with a magnetic layer in which particles of a ferromagnetic powder comprising a metal or an alloy consisting mainly of iron and having a coercive force of about 1,000 Oe or higher and a BET specific surface area in the range from about 25 to 70 m²/g are oriented at random or in a circumferential direction, said magnetic layer having a residual magnetic flux density in the circumferential direction of at least 1500 gauss.

2. A disc-shaped magnetic recording medium according to claim 1, characterized in that a square ratio in one direction is in the range from 80 to 100% of a square ratio in a direction perpendicular thereto.

3. A disc-shaped magnetic recording medium according to claim 1, characterized in that a square ratio in one direction is in the range from 95 to 100% of a square ratio in a direction perpendicular thereto.

4. A disc-shaped magnetic recording medium according to claim 1, characterized in that a treatment for providing a random or circumferential orientation is conducted in a magnetic field after coating of the magnetic layer is performed, and said magnetic layer is then dried after the orientation treatment.

5. A disc-shaped magnetic recording medium according to claim 1, characterized in that the magnetic layer has a thickness in the range from 0.5 to 5 μm.

* * * * *